C. A. AND G. E. STUART.
TIRE PROTECTOR.
APPLICATION FILED SEPT. 8, 1919.
1,362,516.
Patented Dec. 14, 1920.
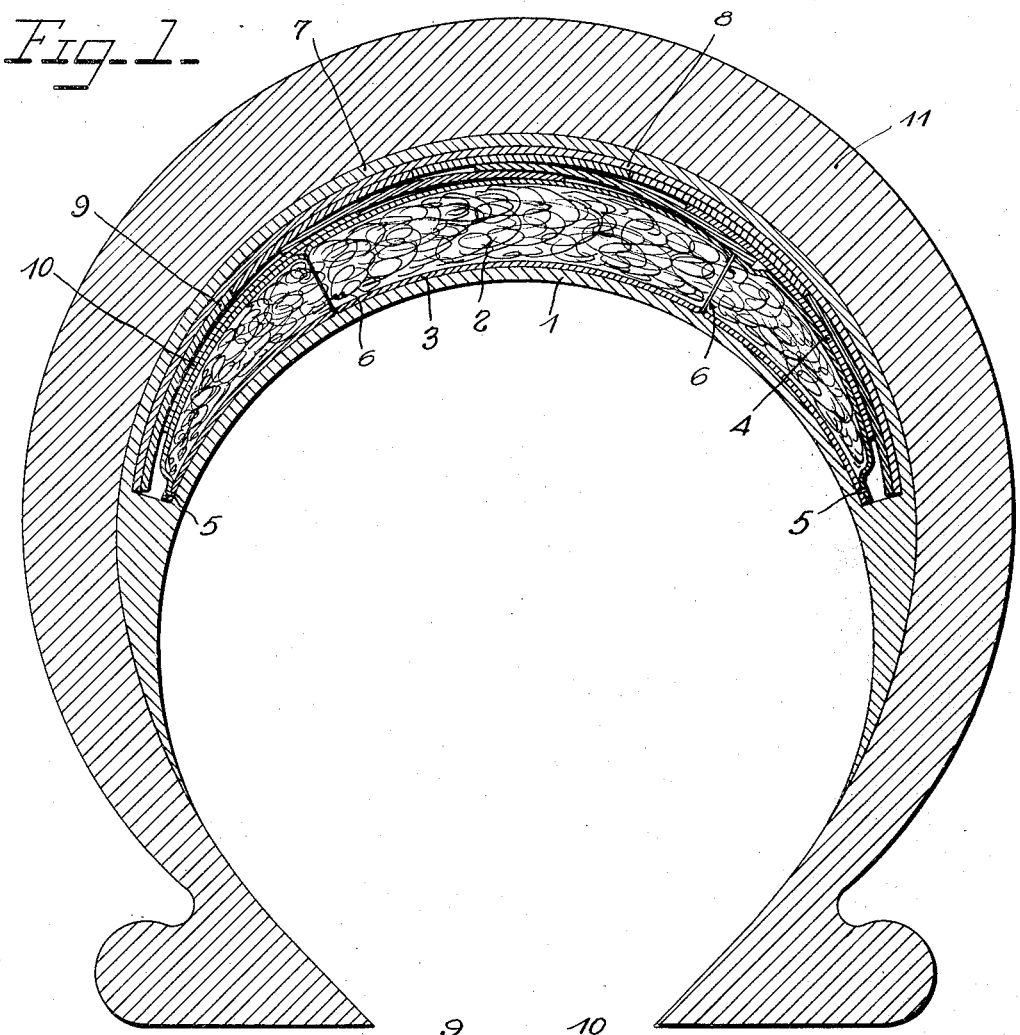
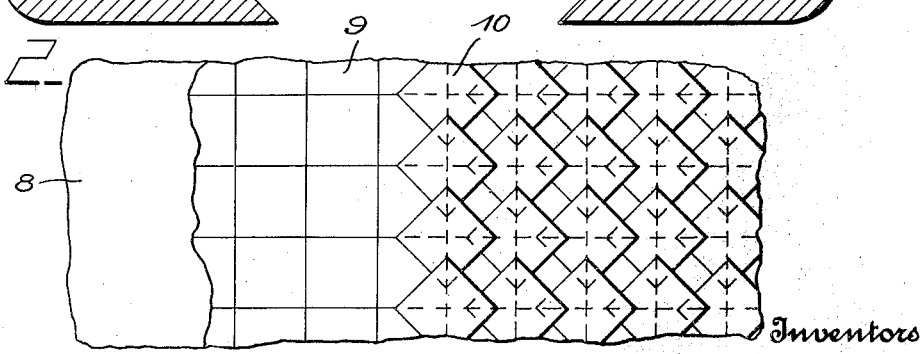

UNITED STATES PATENT OFFICE.

CHARLES ALBERT STUART AND GEORGE EDWARD STUART, OF OREGON CITY, OREGON.

TIRE-PROTECTOR.

1,362,516.   Specification of Letters Patent.   Patented Dec. 14, 1920.

Application filed September 8, 1919. Serial No. 322,346.

*To all whom it may concern:*

Be it know that we, CHARLES A. STUART and GEORGE E. STUART, citizens of the United States, residing at Oregon City, in the county of Clackamas and State of Oregon, have invented certain new and useful Improvements in Tire-Protectors; and we do declare the following to be a full, clear, and exact description of the invention, such as will enable others skilled in the art to which it appertains to make and use the same.

This invention relates generally to vehicle tires, but more particularly to internal armors or protectors for pneumatic tires.

The principal object of the invention is to provide an armor or protector to be placed inside of a tire casing to prevent sharp objects such as nails, tacks and the like which project through the casing from coming into contact with the inner pneumatic tube or tire.

Another object of the invention is to provide a device of this class which will be comparatively simple, strong, durable and inexpensive in construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings forming a part of the specification and in which similar reference characters designate like parts throughout the several views, Figure 1 is a transverse sectional view of a tire casing and internal armor or protector constructed in accordance with this invention; and, Fig. 2 is an elevation of a portion of the laminated fabric protective cover, being broken away at various places to show the construction of the various layers, and said view being taken from the interior of the tire.

The preferred form of the invention comprises an inner layer 1 of rubber or rubberized canvas against which rests a pad 2 of unwoven cotton fiber such as the absorbent cotton used by surgeons. This pad 2 is contained in a suitable pocket or case formed of an inner strip 3 and an outer strip 4 secured at its edges to the edges of the strip 3 by means of the stitching 5. The pad 2 is thicker at its intermediate portion than at its edges and is prevented from balling by means of rows of stitching 6 which are disposed at various intervals across the width of the pad. The strips 3 and 4 may be made of any suitable material but are preferably made of a coarse or tough muslin. The numeral 7 designates an outer strip of rubber or rubberized canvas. Secured to the inner side of this is a strip 8 of heavy canvas or heavy muslin which is impregnated with a solution composed of a mixture of fish glue, resin and mastic. This solution makes the strip 8 tough and increases its resisting power to penetration by sharp objects. The strip 8 is preferably secured to the rubber strip 7 by means of a suitable gelatin solution which dries or hardens after standing.

Secured to the inner side of the strip 8 by means of the gelatin solution above referred to is a layer of small square-shaped pieces of canvas 9. These are arranged edge to edge over the entire strip 8 and are also impregnated with the solution of fish glue, resin and mastic. The next layer consists of a number of square-shaped patches or pieces of canvas 10 which have their corners overlapping and are secured to one another and to the pieces 9 by means of the gelatin solution. The diagonals of the pieces 10 are arranged obliquely to those of the pieces 9. These patches 10 like the patches 9 and the strip 8 are treated with the mixture of fish glue, rosin and mastic, and are hence of a rather tough nature. After the pad 2 and the various layers of fabric disposed on the outside of the same have been arranged as shown, the rubber strips 2 and 7 are connected together at their edges by cementing or vulcanizing so that the strips are in effect integral.

In using the device it is placed inside of a tire casing 11 and in order to prevent it from slipping or creeping in the casing, the outer side of the rubber strip 7 is cemented to the inner side of the casing. When an inner pneumatic tube is placed within the casing and a nail, tack or other sharp object has penetrated the casing 11, and the strips 7 and 8 it will come into engagement with the small pieces of canvas or patches 9 and 10. Inasmuch as these are connected to the strip 8 by the gelatin, these patches will easily become loosened from one another and the strip 8 and will twist, fold or bunch around the nail or tack and prevent the latter from penetrating any farther into the armor than possibly the cushion pad. If the nail with one or more of the fabric pieces bunched around it goes as far as the cushion pad, this being composed of a woven cotton fiber will have a marked effect upon stopping the further penetration and thus preventing the inner pneumatic tube from being punctured.

If desired the outer strip 7 may be vulcanized to the outer casing 11 so that the tire protector may be integrally connected to the casing. It may be formed as a part of the tire casing.

From the foregoing description, taken in connection with the accompanying drawings, the construction and use of the invention may be readily understood.

Various changes in form, proportion, and in the minor details of construction may be resorted to without departing from the spirit of the invention as defined in the claims.

What is claimed is:

1. A tire protector adapted to be placed inside of an outer tire casing around the outer peripheral portion of the pneumatic inner tube contained therein; said protector including superimposed layers of small pieces of flexible puncture resisting material arranged so that the pieces of one layer overlap the pieces of another layer, said pieces being easily separable from one another to adapt one or more of them, when engaged by an object penetrating the outer casing, to bunch around said object; and a flexible compressible pad disposed at the inner side of said layers and capable of resisting further penetration of said object and the layer piece or pieces bunched therearound.

2. A tire protector adapted to be placed inside of an outer tire casing around the outer peripheral portion of the pneumatic inner tube contained therein; said protector including at least two superimposed layers of small quadrangular pieces of flexible puncture-resisting material, the pieces of one layer being disposed edge to edge, the pieces of the other layer having their corners overlapped and being arranged with their diagonals oblique to the diagonals of the pieces of the first layer and opposite the joint lines of the pieces of the first layer, said pieces being easily separable from one another to adapt one or more of them, when engaged by an object penetrating the outer casing, to bunch around said object; and a flexible compressible pad disposed at the inner side of said layers and capable of resisting further penetration of said object and the layer piece or pieces bunched therearound.

3. A tire protector adapted to be placed inside of an outer casing around the outer peripheral portion of the pneumatic inner tube contained therein; said protector including superimposed layers of small pieces of flexible puncture-resisting material arranged so that the pieces of one layer overlap the pieces of another layer, a backing sheet of flexible material to which said pieces are glued, so as to be easily separable therefrom and from one another to adapt one or more of them, when engaged by an object penetrating the outer casing, to bunch around said object; and a flexible compressible pad disposed at the inner side of said layers and capable of resisting further penetration of said object and the layer piece or pieces bunched therearound, said pad decreasing in thickness from its intermediate portion to its edges.

In testimony whereof we have hereunto set our hands.

CHARLES ALBERT STUART.
GEORGE EDWARD STUART.